Patented Oct. 19, 1937

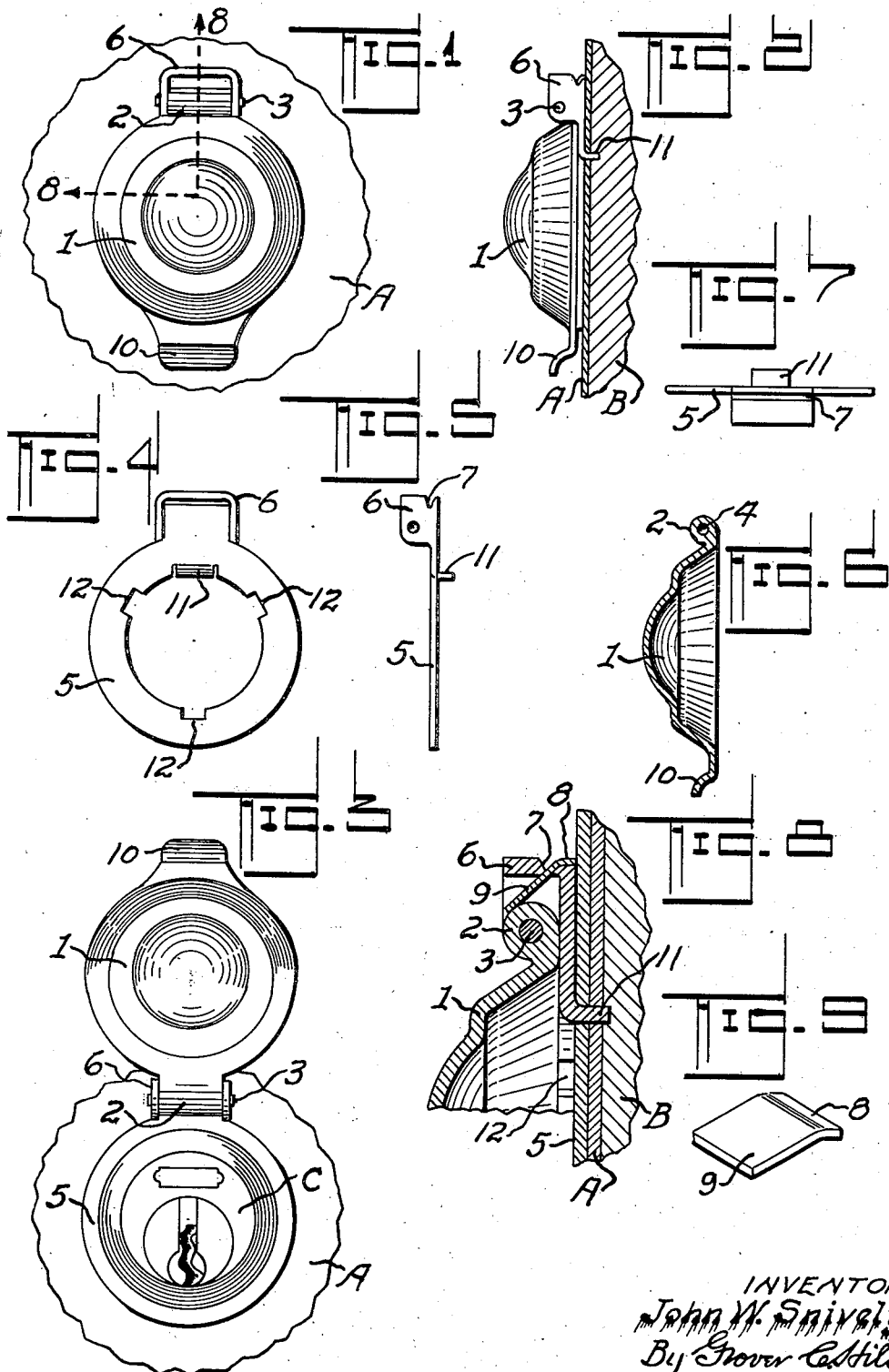

2,096,568

UNITED STATES PATENT OFFICE 2,096,568

COVER FOR MOTOR VEHICLE LOCKS

John W. Snively, Detroit, Mich.

Application June 8, 1936, Serial No. 84,037

5 Claims. (Cl. 70—455)

The present invention relates to improvement in certain locks adapted for use upon the exterior of motor vehicle body doors, and the principal object of the invention is to provide a metallic cover for the lock hingedly secured to a metal frame independent of the lock for the purpose of preventing water or other foreign matter from entering the lock thereby clogging the same and causing extreme difficulty in attempting to insert a key therein.

Inasmuch as locks of this type are customarily provided with a delicate mechanism, such as small pins and springs, slight clogging will interfere with or render the lock completely useless.

In all of the unprotected locks of this class water entering them during weather of freezing temperature the ice clogs and fills the lock to the extent that it is impossible to insert a key therein without resorting to heat of some kind for thawing purposes. This annoyance is completely prevented inasmuch as the lock is entirely sealed where the key is intended to be inserted, thus preventing water from entering the lock at all times.

This cover is particularly adapted for locks within the door and not the door knob.

The invention possesses further advantages, all of which will become readily apparent during the course of the following detailed description, illustrated throughout the accompanying drawing, and more fully pointed out in the appended claims.

With reference to the drawing:

Figure 1 is a front elevation of the complete invention, showing the same normally secured to a vehicle door.

Figure 2 is a side elevation assembly, with the door shown in part section.

Figure 3 is a front elevation of the invention showing the same in an open position.

Figure 4 is an elevation of the principal frame member, and Figure 5 is a side elevation thereof.

Figure 6 is a section of the cap member taken vertically through the center thereof.

Figure 7 is a top plan view of the frame member.

Figure 8 is a greatly enlarged section taken upon line 8—8 of Figure 1.

Figure 9 is an isometric view of the spring employed for the device.

In further disclosing my invention, it is to be understood that certain elements directly associated therewith but not a part thereof, will be designated by consecutive alphabetical letters, while the invention proper will be characterized by the customary reference numerals.

The invention comprises metallic cap 1 of the particular formation as indicated, and having upon the top portion thereof laterally extending lug 2 which is an integral part thereof. The purpose of lug 2 is to accommodate pin 3 which slidably engages aperture 4 therethrough.

A metallic frame member is provided and has circumferentially arranged body 5 which forms a collar as indicated.

The top portion of the frame member is provided with box-like formation as at 6 so as to accommodate lug 2 of cap 1, and also to provide a suitable bearing for the ends of pin 3, and it is understood that cap 1 is pivotally connected to said frame in this manner.

Referring more particularly to Figures 7 and 8 it is noted that elongated slot 7 is provided in portion 6 so as to accommodate end 8 of spring 9, said spring is adapted to bear upon lug 2 so as to exert a friction upon cap 1 for the purpose of retaining the same in an open position as shown in Figure 3, and also to keep said cap snugly adjacent body 5 of the frame member when the cap is closed. It is further noted that finger grip 10 is provided upon the lower portion of cap 1.

The device is secured to metal A of door B by providing a slight opening in said metal so as to detachably receive lip 11 which is integral with body 5 of the frame member, as clearly indicated in the drawing.

With reference to Figures 3 and 4, notches 12 within body 5 of the frame member, are provided so as to engage respective lugs upon lock C, said lock being typical of the modern motor vehicle locks for the doors thereof.

In conclusion it should be understood that the disclosure herewith is merely illustrative of the general principle involved without restrictions as to the proportion and design of the invention in the event that any probable further development of the same may necessitate minor modification thereof.

Having thus fully described my invention, what I claim as new is:

1. In a key hole cover construction for cylinder locks, a frame for disposition around the lock, a lug extending rearwardly from the frame for securing the same on a support in which the lock is mounted, a cap adapted to cover the key hole of the lock pivotally mounted at the top portion of the frame, a forwardly projecting lug arranged at the top of the frame for disposition over the hinged end of the cap, and a spring carried by the last mentioned lug and coacting with the hinged end of the cap for holding the same in a closed or open position.

2. In a key hole cover construction for cylinder locks, a frame for disposition around the lock, a cap having a lug formed at its top portion, means for pivotally connecting the lug and cap to the top portion of the frame whereby said cap is capable of swinging movement over the key hole of the lock, a forwardly projecting lug arranged at the top of the frame for disposition over the hinged end of the cap and being formed with a slot, and a flat spring disposed through said slot, one end of the spring bearing upon the top face of the slotted lug while the other end of the spring is adapted to bear against the lug on the cap for holding the latter in a closed or open position.

3. In a key hole cover construction for cylinder locks, a frame for disposition around the lock, a cap having a lug formed at its top portion, means for pivotally connecting the lug and cap to the top portion of the frame whereby said cap is capable of swinging movement over the key hole of the lock, a forwardly projecting lug arranged at the top of the frame for disposition over the hinged end of the cap and being formed with a slot, and a flat spring disposed through said slot, one end of the spring bearing upon the top face of the slotted lug while the other end of the spring is adapted to bear against the lug on the cap for holding the latter in a closed or open position, and a lug extending rearwardly from the frame for securing the latter on a support in which the lock is mounted.

4. In a key hole cover construction for cylinder locks, a circular frame for disposition around the lock, a box like formation formed at the top of the frame and including a top and side walls, the top wall being formed with a transverse slot, a cap having an apertured lug formed at its top, said apertured lug being disposed within the box like formation, a pintle extending through said apertured lug and the side walls of the box like formation for pivotally securing the cap on the frame, whereby the cap may swing over the key hole of the lock, and a flat spring disposed through the slot in the top wall of the box like formation, the upper end of the flat spring being deflected and adapted to bear against the top face of said top wall, the lower end of said flat spring bearing against the apertured lug on the cap for holding the latter in a closed or opened position.

5. In a key hole cover construction for cylinder locks, a circular frame for disposition around the lock, a box like formation formed at the top of the frame and including a top and side walls, the top wall being formed with a transverse slot, a cap having an apertured lug formed at its top, said apertured lug being disposed within the box like formation, a pintle extending through said apertured lug and the side walls of the box like formation for pivotally securing the cap on the frame, whereby the cap may swing over the key hole of the lock, and a flat spring disposed through the slot in the top wall of the box like formation, the upper end of the flat spring being deflected and adapted to bear against the top face of said top wall, the lower end of said flat spring bearing against the apertured lug on the cap for holding the latter in a closed or opened position, and a rearwardly extending lug formed on the frame for securing the same on a support in which the lock is mounted.

JOHN W. SNIVELY.